(12) United States Patent
Duance

(10) Patent No.: US 6,847,204 B1
(45) Date of Patent: Jan. 25, 2005

(54) SENSOR MEMORY ELECTRONIC CIRCUIT

(75) Inventor: Roger Kent Duance, Lonsdale (AU)

(73) Assignee: Shefenacker Visions Systems Australia Pty Ltd, Lonsdale (AU)

( * ) Notice: Subject to any disclaimer, the term of this patent is extended or adjusted under 35 U.S.C. 154(b) by 350 days.

(21) Appl. No.: 10/088,044

(22) PCT Filed: Sep. 15, 2000

(86) PCT No.: PCT/AU00/01101
§ 371 (c)(1),
(2), (4) Date: Mar. 14, 2002

(87) PCT Pub. No.: WO01/20262
PCT Pub. Date: Mar. 22, 2001

(30) Foreign Application Priority Data

Sep. 16, 1999 (AU) .............................................. PQ2858

(51) Int. Cl.$^7$ ................................................. G01B 7/14
(52) U.S. Cl. ................................ 324/207.2; 324/207.13
(58) Field of Search ........................ 324/207.11, 207.13, 324/207.2, 117 H; 73/862.331, DIG. 2–DIG. 3; 327/510–511

(56) References Cited

U.S. PATENT DOCUMENTS

| 4,538,063 A | 8/1985 | Bulat | |
|---|---|---|---|
| 4,569,233 A | * 2/1986 | Rosaen | ..................... 73/861.42 |
| 4,856,885 A | 8/1989 | Fimeri | |
| 5,694,040 A | * 12/1997 | Plagens | ................... 324/207.2 |

FOREIGN PATENT DOCUMENTS

GB         2102364         2/1983

* cited by examiner

Primary Examiner—Bot LeDynh
(74) Attorney, Agent, or Firm—Warn, Hoffmann, Miller & LaLone, P.C.

(57) ABSTRACT

Position sensing control of the displacement of a first member relative to a second member particularly in a vehicular environment is aided by having a ratiometric relationship between the voltage supply for the sensor and the measuring/control portion of the apparatus. In an embodiment, the relative position of a rear view mirror to its housing is controlled. To facilitate the return of a mirror to a preferred position, the conversion of sensor voltage output to a current and the storage of the current of one or more preferred positions allows for the repeatable setting of the rear view mirror. Over and under voltage protection of the sensor supply voltage provides for consistent measurement and control characteristics.

18 Claims, 3 Drawing Sheets

SENSOR MEMORY ELECTRONIC CIRCUIT

This invention relates to position sensing and control and in particular to a method and circuit to measure a displacement of a first member relative to a second member and when used with an associated stored measurement, to control the return of a displaced first member to a former or predetermined position relative to a second member.

BACKGROUND

In this specification, the method and circuit described will be related to rear view mirrors for motor vehicles of the type in which the orientation of the mirror glass is adjustable relative to the mirror housing by way of two screw jack drives arranged to adjust the orientation of the mirror glass about mutually orthogonal axes.

However, it would be possible for the circuit elements and method disclosed herein to be used with any moveable mechanism which can be sensed and then controlled to move to predetermined positions.

One example of a sensor system representing linear displacement is disclosed in European Patent 0907068 entitled "Hall Effect Sensor" in the name of Britax Rainsfords Pty Ltd, the applicant in this matter, that is hereby included in this specification by reference.

Furthermore European Patent 0549173 entitled "Rear View Mirror Assembly for Motor Vehicle" also in the name of Britax Rainsiords Pty Ltd and is referred to in European Patent 0907068, that is also hereby included in this specification by reference.

European Patent 0549173 discloses a rear view mirror assembly for a motor vehicle of the type in which a reflective member is mounted for angular movement on a pivotal mounting attached to a mirror housing, with the drive housing located in the mirror housing having a projecting jacking screw which is pivotally coupled to the rear surface of the reflective mirror at a location remote from the mirror's pivotal mounting.

A problem with any position sensing and control arrangement, and in particular for vehicular environments, is the variability of the supply of power to the drive circuit as well as the position sensors of the arrangement. Power supply variability and the nature of the contact between electrical circuits within a vehicle environment can result in sensing control inaccuracies and potential damage to the control circuitry. Furthermore when voltage sensing from a potentiometer (variable voltage divider) is used to determine relative position sensing such as linear or rotational displacement, accuracy can be detrimentally affected as a result of voltage variation, mechanical wear and environmental influences.

Voltage variation can occur when the vehicle experiences hot and cold environments, in addition there is the further complicating factor of voltage noise spikes caused by radio frequency interference (RFI). All these factors can greatly affect the accuracy and hence repeatability of positional displacement because the voltage measurements used are not reliable.

Furthermore, voltage based systems are designed to have "wetting currents" to overcome the expected high resistance joints in cabling and in doing so also minimise transient voltage drops within the circuits caused by contact resistance in the cabling joints. The existence of "wetting currents" further compromise the use of voltage measurements to determine positional displacement.

It is an aim of this invention to minimise or eliminate these types of problems and design compromises.

BRIEF DESCRIPTION OF THE INVENTION

In a broad aspect of the invention, a position sensing and control apparatus comprises a first supply voltage source supplying a first supply voltage; a sensor powered by said supply voltage and operatively connected to a first member moveable relative to a second member to produce a voltage representative of the position of said first member relative to said second member; a voltage to current converter having a reference voltage supply for converting the voltage output of said sensor to a current wherein said first supply voltage has a ratiometric relationship with said reference voltage.

In a further aspect of the invention, the position sensing and control apparatus further comprises storage memory for storing values of said current representative of a state of a respective sensor; a control circuit for controlling the movement of said first member, arranged to move said first member until said voltage to current converter output is substantially the same as a said stored value of current.

In yet a further aspect of the invention over voltage produced by said first supply voltage is prevented from being supplied to said sensor when a greater than predetermined voltage is detected or when said first supply voltage is smaller than a predetermined voltage.

These and other advantages of the invention will be apparent from an understanding of the information described herein.

A specific embodiment of the invention will now be described in some further detail with reference to and as illustrated in the accompanying figures. This embodiment is illustrative, and is not meant to be restrictive of the scope of the invention. Suggestions and descriptions of other embodiments may be included but they may not be illustrated in the accompanying Figures alternatively features of the invention may be shown in the Figures but not described in the specification.

DETAILED DESCRIPTION OF AN EMBODIMENT OF THE INVENTION

Figure 1:
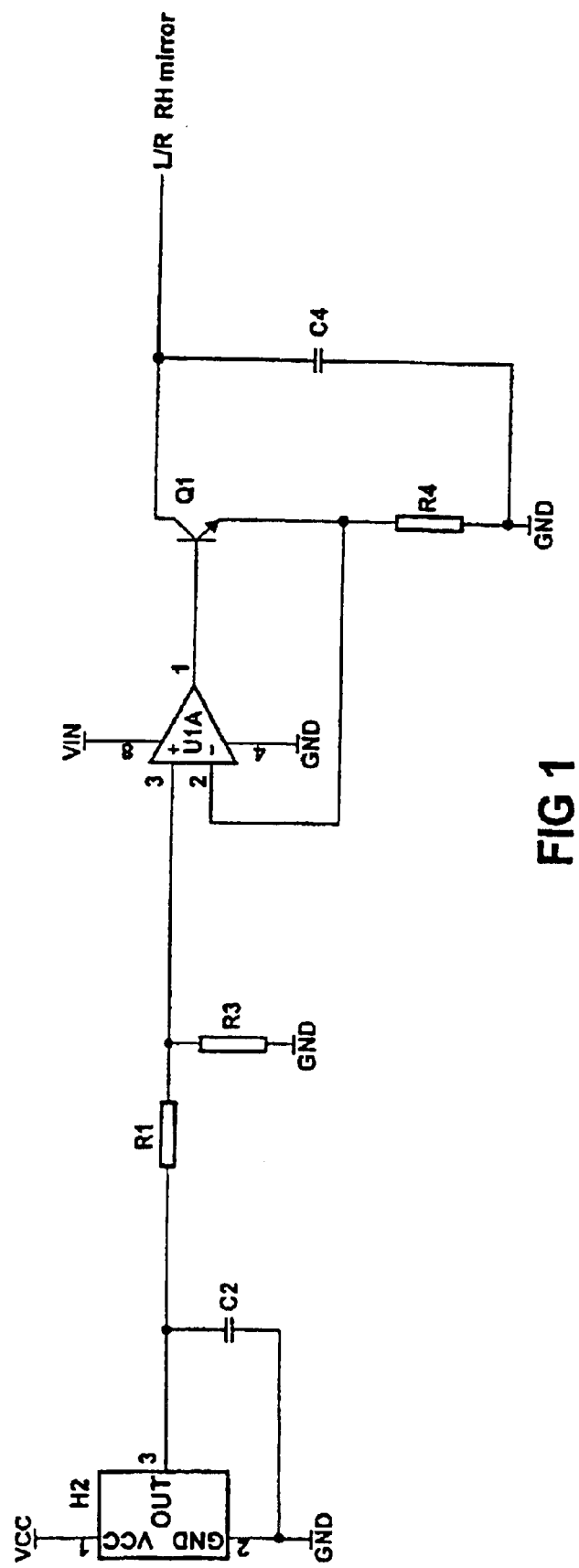
FIG. 1 is a circuit diagram of a voltage to a current converter according to the invention.

As described previously the circuits described herein are applied to rear view mirror assemblies but would be useful in overcoming the same or similar problems in other environments or with other types of sensors.

In this embodiment of a rear view arrangement there are two major components.

First of these components is a rear view mirror assembly incorporating a two axis sensing system coupled to the mirror of the assembly. Vehicles typically have two such assemblies, one located on the driver side and one on the passenger side of the vehicle, both for use by the driver to view rearwardly of the vehicle.

Each rear view mirror assembly can be considered to be a sensor/transmitter component in the context of the rear view mirror assembly.

A typical rear view mirror assembly incorporates two drive systems (commonly, but not limited to, two Direct Current (D.C.) motors and associated mechanical jack systems as described previously) capable of moving a mirror in two mutually orthogonal axes relative to the mirror housing.

Some mirrors require adjustment in only one axis thus only one D.C. motor and associated mechanical jack system would be used.

A rear view mirror assembly also comprises a sensor arrangement for sensing the relative position of the mirror to the mirror housing and typically one sensor is used for each axis of motion of the mirror.

A further element of the mirror assembly is a circuit which transforms the sensor output to a signal for transmission external of the mirror housing.

A second component of a rear view arrangement is a rear view mirror controller typically located in the vehicle and commonly incorporated into the seat positioning module. This component can be considered the receiver/processor for the purposes of this description.

The receiver/processor receives a signal representative of a relative measure of the mirror position in both axes and also has the ability to drive the mirror in a direction relative to both axes (left/right and up/down) via the drive systems installed in the rear view mirror assembly to new positions or to stored predetermined positions.

The mirror assembly is preferably supplied with a regulated voltage supply (typically +5V which is regulated at the receiver/processor end) so that the associated sensor/transmitter circuitry can provide a two axes measure of the mirror surface position relative to the mirror housing. Each axis position is communicated to the receiver/processor in the form of a signal comprising, in this embodiment, a current value which is representative of the relative position of the mirror to the mirror housing. The measurement is sent in this preferred form as it is insensitive to the resistance of the contacts in the connectors used between the mirror assembly and the receiver/processor. A common problem that arises when using voltage measurement values are transmitted as representative of relative position, is that if the transmitter conducts any significant current, which is desirable to "wet" contacts, then the position as measured at the receiver/processor will likely vary dependent on the actual resistance of the connectors. Connectors perform very poorly at extremely low currents that are desirable for an accurate voltage measurement system.

The receiver/processor accepts commands from the vehicle driver to either "save" the current position, or to "recall" a previously saved position.

A "save" command stores in a memory, as current values, the current mirror position measurement by recording the relative position of both axes, as supplied from the sensor/transmitter component of the rear view mirror assembly. The receiver/processor will preferably have a plurality of memory locations into which can be stored a plurality of unique positions of the mirror head for one or more rear view mirrors, as commanded by the driver.

On a "recall" command to a particular stored position from the driver, the receiver/processor proceeds to drive the mirror via the drive system in such a direction so as to equate the present current values as measured by the mirror assembly with the stored position current values. It does this for both axes either simultaneously or sequentially for each mirror commanded to be changed. The result is that the mirror returns to a preferred stored position and does so by making the measured position correspond to the stored position for both axes of movement. It should be noted that a single axis mirror would only require one current measurement for each position stored.

The sensor/transmitter of the rear view mirror assembly also incorporates a circuit to protect the sensing circuit and drive circuits against over voltages which can occur on automotive voltage supply rails. As it is desirable to supply the mirror assembly, which preferably uses a Hall Effect sensor measurement circuit, with the same voltage as is supplied at the receiver/processor, a "switch" is interposed between the receiver/processor and the supply voltage to the mirror assembly. This switch, preferably electronic, is rapidly switched off to cease the supply of power to the rear view mirror assembly in the event of an over voltage as measured on the supply to the mirror assembly. It is desirable that the supply voltage to the sensor/transmitter component tracks the voltage of the receiver/processor as that voltage is then useable as a reference for the voltage to be supplied to the sensor/transmitter.

The output voltages from the sensors in the external rear view mirror housing are thus actually a percentage of the supplied voltage to those sensors, and not an absolute voltage. As the receiver/microprocessor also measures the incoming voltage as a percentage of the applied voltage, these two circuits are thus "ratiometric" and are insensitive to the actual rail voltage supplied by the vehicle as long as that rail voltage is within acceptable values. Although it is preferable to use a Hall Effect sensor it is possible to use the industry standard potentiometer sensor as well as any other suitable sensor device.

It is believed by the inventors that the use of current to measure and compare mirror position actuation has not heretofore been used in a vehicle, where is it typical for mirror systems simply to use voltage sensing from a potentiometer (variable voltage divider) to determine mirror position on one or more axes.

The prior methods have the disadvantage of having to incorporate elements subject to wear over time which can affect the sensitivity of these circuits to environmental influences, which consequently affect the accuracy and repeatability of the circuits. Prior approaches to the design of rear view mirror assemblies have involved the desire to use extremely low current draw from the potentiometer so as to avoid influencing the voltage measurement and thus the sensed position. However, this is at odds with the requirement to provide sufficient current through the connecting cables to reduce the effects of contact resistance in the circuit which is typically overcome by providing a "wetting current".

In this embodiment Hall Effect sensors are preferably used to measure the relative displacement of a first member (the mirror) about an axis of the pivotable mirror with reference to a second member (the mirror housing) by sensing the magnitude of a magnetic field from a magnet attached to the moving mirror relative to a sensor stationary on the mirror housing. The Hall Effect sensor output voltage is converted to a current proportional to the magnetic field, and hence, mirror position relative to the mirror housing is available for transmission to the receiver/processor. As discussed, the sensor voltage is produced as a proportion of a voltage which is in constant proportion to the voltage existing at the receiver/processor. The current produced with the voltage to current converter, is also operated by a voltage referenced to the voltage at the receiver/processor, thus the current provided by the voltage to current converter is an repeatable representation of the mirror position which is immune to vehicle voltage supply variations which are not uncommon.

Over voltage conditions are controlled by the use of a fast acting switch to switch "off" the supply of voltage to the Hall sensors whenever an over voltage is detected. The supply is automatically switched back on when the over voltage returns to a safe level. All the relevant circuit thus remains essentially ratiometric within preset limits thus eliminating or reducing the effect of different supply voltages at each end of the measurement and control circuits. If two voltage regulators with different characteristics were used at the sensor/transmitter and the receiver/processor, problems as discussed would arise. In this embodiment the voltage supply at the receiver/processor acts as a comparison voltage ("reference voltage") and the microprocessor which is used for converting analogue current values to digital signals, the same reference voltage is also used.

Figure 2:
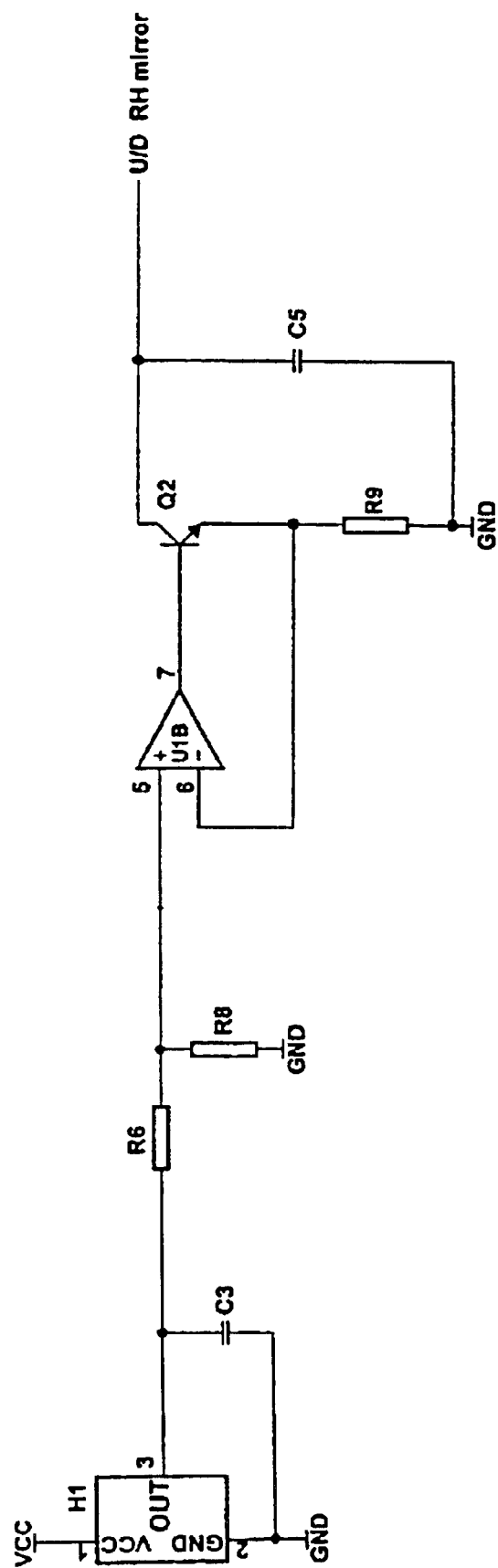
FIG. 2 is a circuit diagram of a voltage to current converter according to the invention.
Figure 3:
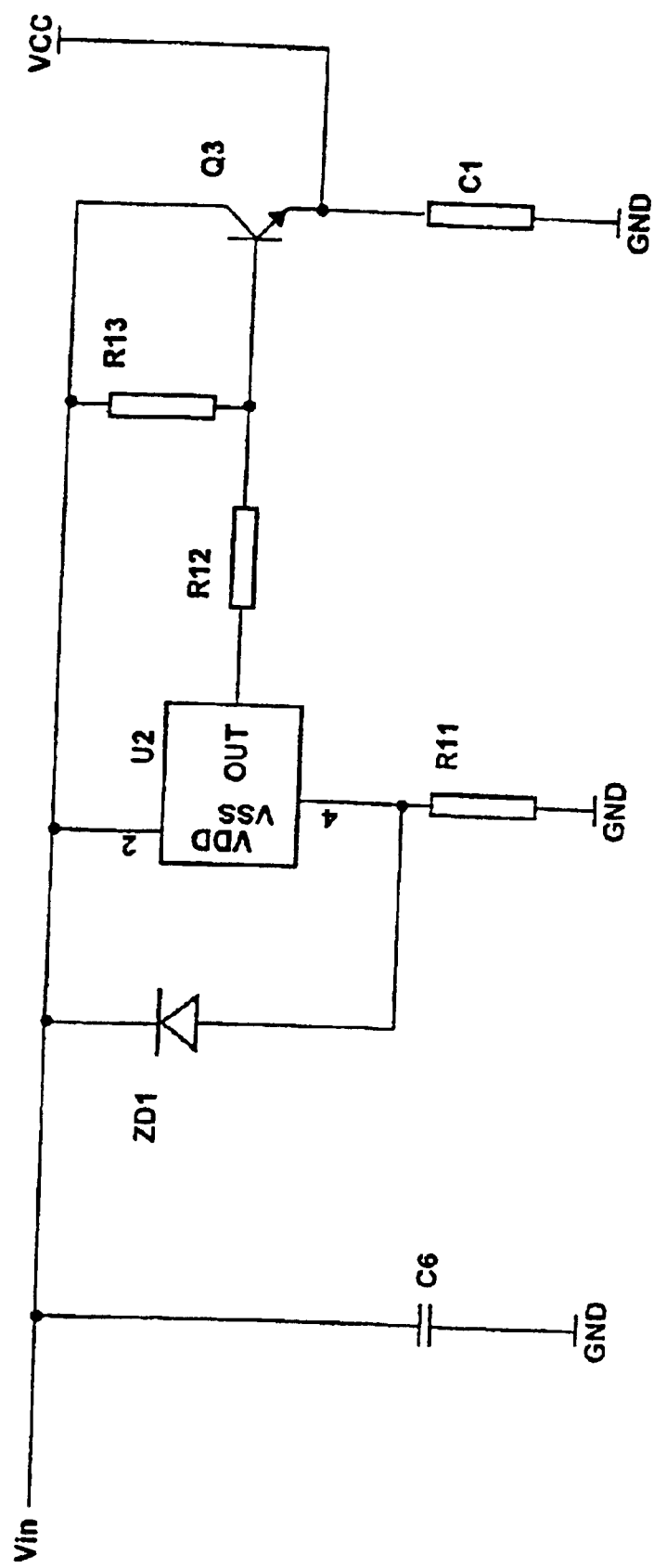
FIG. 3 is a supply voltage controller circuit according to the invention.

Referring to FIGS. 1, 2 and 3, the mirror assembly circuit comprises two identical position conditioner circuits (FIGS. 1 and 2) and a supply voltage conditioner circuit (FIG. 3).

The position conditioner circuit determines the position of the mirror glass by using the voltage output of a Hall Effect sensor. The Hall Effect sensor attached to the mirror housing produces an output voltage representative of the position of a magnet connected to the moveable mirror glass while being supplied a substantially constant voltage. Refer to European patents 0907068 and 2549173 as previously disclosed for further technical details regarding the operation of a preferred Hall Effect sensor.

The sensor output voltage is converted to an output current via U1A and Q1 and this current is transmitted to the receiver/transmitter which is, as previously mentioned, part of the seat module of a vehicle. Both the left/right movement of the mirror glass relative to the mirror housing and the up/down movement of the glass relative to the mirror housing are sensed using sensor and magnet pairs arranged to detect relative movement, one pair for each axis of movement.

The Hall Effect sensor voltage is divided by 10 by resistors R1 and R3 (which are high in precision value resistors) and presented to the positive input of an operational amplifier U1A. The output of this amplifier is high (voltage) when the positive input is greater than the negative input. The output voltage is supplied to the base of a transistor Q1 connected as an emitter follower. As the output voltage of U1A increases, so does the voltage appearing across the resistor R4, which is fed back to the negative input of U1A. When the fed back voltage reaches the voltage existing at the positive input (the Hall Effect sensor voltage divided by 10) the output voltage of U1A is decreased until it maintains a condition whereby the two inputs to the operational amplifier are equal. As the Hall Effect sensor voltage is divided by a factor of 10, there will typically be 0.25 volts appearing across R4 for an input voltage of 2.5 volts. This results in a current of 2.5 milliamps through R4 the range of which can be varied by altering R4.

The collector current (output) of Q1 is effectively the same as the emitter current, that which flows through the resistor R4 (less the base current, which in this circuit is typically 1/500 of the emitter current).

As a result, there is an output current which is an accurate representation of the Hall Effect sensor voltage and hence the mirror position along one of its axes relative to the mirror housing. In this embodiment there exists a scaling of 1 milliamp per volt output from the Hall Effect sensor, which can be altered, if required, by varying the divider resistors and the current sense resistor.

The second axis of the mirror position is conditioned by a second circuit consisting of U1B and Q2 and their associated components as is depicted in FIG. 2 in the same manner as that described for the circuit in FIG. 1.

At the receiving end of the output line of the circuits of FIG. 1 and FIG. 2 (at the receiver/processor, not shown) the line is terminated with for example a 1000 ohm resistor (not shown) connected to a +5 volt supply which is designated as $V_{in}$ on the circuit depicted in FIG. 3. The current flowing through this resistor, and hence the voltage appearing across it, is controlled by the above described sensor/transmitter circuit and is representative of the position of the mirror glass relative to the mirror housing.

Thus, with such a circuit arrangement, even if there is significant resistance in the connectors between the mirror (sensor/transmitter) and the receiver/processor in the seat module (a common problem), there is no change to the value of the current flowing. Therefore the sensed voltage at the receiver end is communicated to the receiver and remains an accurate representation of the mirror position relative to the mirror housing.

As discussed the third part of the mirror assembly circuit comprises a voltage controlled switch supplying the circuit (FIG. 3).

The normal method of suppressing unwanted over voltage conditions commonly occurring in vehicles is to use a voltage regulator integrated circuit chip, which is commonly available, or alternatively using such a chip in combination with a zener diode, which acts as a crude voltage regulator. In both cases the voltage presented as a voltage supply is significantly reduced from the incoming voltage, is imprecise in its over voltage control due to component characteristic variabilities and environmental conditions or demands expensive or large electronic components to achieve the desired objectives of a stable regulated power supply for every component of a rear view mirror assembly.

Hall Effect sensors are particularly sensitive to over voltage and thus in this embodiment it is preferable to have the voltage supplied to the Hall Effect sensors closely tracking the incoming voltage which is typically regulated at the receiver/processor end. If this condition is satisfied the rear view mirror assembly circuit will not be sensitive to small variations in the supply voltage, as the "same" (regulated) voltage can be supplied to the receiver/processor and in particular to circuits such as a microprocessor analog-to-digital converter as a reference voltage as that voltage which is supplied to the Hall Effect sensors. What is thus provided in this embodiment is known as a "ratiometric" circuit, in that the voltage output from the Hall Effect sensor is a ratio of the supply voltage, and the analog-to-digital converter microprocessor input at the receiver/processor end is expressed as a ratio of that same voltage. This arrangement dramatically decreases the sensitivity of the system to small variants in the typically +5 volts regulated supply.

In the embodiment of the over voltage protection circuit depicted in FIG. 3, U2 is a specialised component typically used to function as a microprocessor reset for low voltages. It is used in this embodiment in a novel way, to switch "on" transistor Q3 in the saturated condition so as to divert or switch incoming voltage through to the remainder of the circuit which includes the Hall Effect sensors. The saturated condition of a transistor ensures the lowest possible voltage drop across the transistor during its "on" state.

When U2 detects a voltage above a predetermined voltage say 5.5 volts, it switches "off" the transistor Q3 and hence the supply voltage to the rest of the circuit.

The result is that the voltage supplied to the circuit is kept a close representation of the incoming voltage except when it is raised, for whatever reason, above a predetermined voltage, say 5.5 volts (a fault condition), when it is totally switched "off" until the incoming voltage decreases to below, a predetermined voltage, say approximately 5.2 volts. The decision to use these upper and lower limits is based on the typical operating conditions of the chip U2 and experimental data based on that chip.

Zener Diode ZD1 and R1 serve to protect U2 from excessive voltages. Various capacitors are used in the circuit to protect against transient voltage peaks and to suppress possible interfering oscillations such as those caused by RFI.

It will be appreciated by those skilled in the art, that the invention is not restricted in its use to the particular application described and neither is the present invention restricted in its preferred embodiment with regard to the particular elements and/or features described or depicted herein. It will be appreciated that various modifications can be made without departing from the principles of the invention, therefore, the invention should be understood to include all such modifications within its scope.

The claims defining the invention are as follows:

1. A position sensing and control apparatus comprising:
   a first supply voltage source supplying a first supply voltage;
   a sensor powered by said supply voltage and operatively connected to a first member moveable relative to a second member to produce a voltage representative of the position of said first member relative to said second member; and
   a voltage to current converter having a reference voltage supply for converting the voltage output of said sensor to a current wherein said first supply voltage has a ratiometric relationship with said reference voltage.

2. A position sensing and control apparatus according to claim 1 further comprising:
   a storage memory for storing values of said current representative of a state of a respective sensor; and
   a control circuit for controlling the movement of said first member, arranged to move said first member until said voltage to current converter output is substantially the same as a said stored value of current.

3. A position sensing and control apparatus according to claim 1 further comprising:
   A voltage detector for detecting said first supply voltage that prevents said first supply voltage from being supplied to said sensor when a greater than predetermined voltage is detected.

4. A position sensing and control apparatus according to claim 3 wherein said voltage detector further comprises a switch interposed between said control circuit and said first supply voltage source used to isolate said control circuit and said supply voltage source when said first supply voltage is smaller or greater than predetermined voltages.

5. A position sensing and control apparatus according to claim 4 wherein said switch comprises a transistor, the base of which is connected to and controlled by an output voltage of said voltage detector.

6. A position sensing and control apparatus according to claim 1 wherein said sensor is a Hall Effect device.

7. A position sensing and control apparatus according to claim 1 wherein said voltage to current converter comprises an operational amplifier having a positive and negative input for receiving a voltage output from said sensor at said positive input and an output of said operational amplifier being high when said positive input is greater than said negative input, the output of said operational amplifier being input to the base of an emitter follow transistor, the emitter of which is connected to a resistive circuit to ground and above which a voltage feedback circuit to said negative input of said operational amplifier is provide, wherein as said feedback voltage reaches the value of said input voltage to said positive input, the output voltage of said operational amplifier decreases until said positive and negative voltage inputs are the same the result of which there is, as a result of the ratiometric relationship between the reference between said first supply voltage of said sensor and said reference voltage supply of said voltage to current converter, the current through said resistance circuit is representative of said sensor position.

8. A position sensing and control apparatus according to claim 7 wherein the collector current of said emitter follow transistor is substantially the same as said current through said resistance circuit.

9. A position sensing and control device for sensing and controlling the position of a moveable member with respect to a stationary member, said device comprising:
   a sensor mounted to one or both of the moveable member and the stationary member, said sensor being responsive to a supply voltage signal and providing a sensor voltage signal indicative of the position of the moveable member relative to the stationary member; and
   a voltage to current converter responsive to the sensor voltage signal, said voltage to current converter converting the sensor voltage signal to a representative current signal to provide an indication, wherein the voltage to current converter includes a comparator responsive to the sensor voltage signal and a feedback voltage signal, said comparator outputting a comparator voltage signal if the sensor voltage signal is greater than the feedback voltage signal.

10. The device according to claim 9 wherein the voltage to current converter further includes an emitter follower bipolar transistor and a resistor coupled to an emitter terminal of the transistor, said current signal being provided at a collector terminal of the transistor, wherein a base terminal of the transistor is responsive to the comparator voltage signal and the feedback voltage signal is provided at the emitter terminal of the transistor, and wherein the feedback voltage signal increases as the comparator voltage signal increases so that the difference between the sensor voltage signal and the feedback voltage signal is reduced.

11. A position sensing and control device for sensing and controlling the position of a moveable member with respect to a stationary member, said device comprising:
   a sensor mounted to one both of the moveable member and the stationary member, said sensor being responsive to a supply voltage signal and providing a sensor voltage signal indicative of the position of the moveable member relative to the stationary member;
   a voltage to current converter responsive to the sensor voltage signal, said voltage to current converter converting the sensor voltage signal to a representative current signal to provide an indication of the position of the moveable member; and
   a voltage detection circuit for detecting the supply voltage signal, said voltage detection circuit including a voltage detector and a switch, said voltage detector determining whether the supply voltage signal rises above a first predetermined voltage and falls below a second predetermined voltage, said voltage detector causing the switch to turn off the supply voltage signal to the sensor if the supply voltage signal rises above the first predetermined voltage and causes the supply voltage signal to be applied to the sensor if the supply voltage signal falls below the second predetermined voltage.

12. The device according to claim 11 wherein the switch is a bipolar transistor, wherein the detector is coupled to a base terminal of the bipolar transistor, and wherein the supply voltage signal is transferred to an emitter terminal of the bipolar transistor if the supply voltage signal is below the first predetermined voltage.

13. A position sensing and control device for sensing and controlling the position of a vehicle mirror with respect to a mirror housing, said device comprising:

a sensor mounted to one or both of the vehicle mirror and the mirror housing, said sensor being responsive to a supply signal and providing a sensor voltage signal indicative of the position of the vehicle mirror relative to the mirror housing, and a voltage to current converter responsive to the sensor voltage signal, said voltage to current converting the sensor voltage signal to a representative current signal to provide an indication of the position of the vehicle mirror.

14. A position sensing and control device for sensing and controlling the position of a moveable member with respect to a stationary member, said device comprising:

a sensor mounted to one or both the moveable member and the stationary member, said sensor being responsive to a supply voltage signal and providing a sensor voltage signal indicative of the position of the moveable member relative to the stationary member;

a voltage to current converter responsive to the sensor voltage signal, said voltage to current converter converting the sensor voltage signal to a representative current signal to provide an indication of the position of the moveable member; and an output voltage of the device indicative of a ratio of the supply voltage signal and a reference voltage signal.

15. A position sensing and control device for sensing and controlling the position of a vehicle mirror with respect to a mirror housing, said device comprising:

a source of a supply voltage signal;

a voltage detection circuit responsive to the supply voltage signal, said voltage detection circuit turning off the supply voltage signal if the supply voltage signal is above a first predetermined voltage and turning the supply voltage signal back on if the supply voltage signal falls below a second predetermined voltage;

a sensor mounted to the mirror, said sensor being responsive to the supply voltage signal from the detection circuit and providing a sensor voltage signal indicative of the position of the mirror relative to the mirror housing; and a voltage to current converter responsive to the sensor voltage signal, said voltage to current converter converting the sensor voltage signal to a representative current signal to provide an indication of the position of the mirror, said voltage to current converter including a comparator responsive to the sensor voltage signal and a feedback voltage signal, said comparator outputting a comparator voltage signal if the sensor voltage signal is greater than the feedback voltage signal.

16. The device according to claim 15 wherein the voltage to current converter further includes an emitter follower bipolar transistor and a resistor electrically coupled to an emitter terminal of the transistor, wherein a base terminal of the transistor is responsive to the comparator voltage signal and the feedback voltage signal is provided at the emitter terminal of the bipolar transistor, and wherein the feedback voltage signal increases as the comparator voltage signal increases so that the difference between the sensor voltage signal and the comparator voltage signal is reduced, said current signal being provided at a collector terminal of the transistor.

17. The device according to claim 15, wherein the voltage detection circuit includes a voltage detector and a switch, said voltage detector determining whether the supply voltage signal is above the first predetermined voltage and below the second predetermined voltage, said voltage detector causing the switch to turn off the voltage supply signal to the sensor if the supply voltage signal rises above the first predetermined voltage and causes the supply voltage signal to be applied to the sensor if the supply voltage signal falls below the second predetermined voltage.

18. The device according to claim 17 wherein the switch is a bipolar transistor, wherein the supply voltage signal from the detector is coupled to a base terminal of the bipolar transistor, and wherein the supply voltage signal is transferred to an emitter terminal of the bipolar transistor if the supply voltage signal is below the first predetermined voltage.

* * * * *

UNITED STATES PATENT AND TRADEMARK OFFICE
CERTIFICATE OF CORRECTION

PATENT NO. : 6,847,204 B1
APPLICATION NO. : 10/088044
DATED : January 25, 2005
INVENTOR(S) : Roger Duance Page 1 of 1

It is certified that error appears in the above-identified patent and that said Letters Patent is hereby corrected as shown below:

Title Page,
Item [73], Assignee, "Shefenacker Visions Systems" should be --Schefenacker Vision Systems--.

Title Page,
Item [57], ABSTRACT, "Position sensing control" should be --Position sensing and control--.

Column 1,
Line 29, "Rainsiords" should be --Rainsfords--.

Column 5,
Line 38, "high in precision" should be --high precision--.

Column 7,
Line 8, "R1" should be --R11--.

Column 10,
Line 29, Claim 17, "15," should be --15--.

Signed and Sealed this

Twenty-fifth Day of July, 2006

JON W. DUDAS
*Director of the United States Patent and Trademark Office*